(12) United States Patent
Inada

(10) Patent No.: US 12,356,125 B2
(45) Date of Patent: Jul. 8, 2025

(54) VARIABLE TILT EQUALIZATION DEVICE AND VARIABLE TILT EQUALIZATION METHOD

(71) Applicant: NEC Corporation, Tokyo (JP)

(72) Inventor: Koji Inada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 255 days.

(21) Appl. No.: 18/197,419

(22) Filed: May 15, 2023

(65) Prior Publication Data

US 2023/0379605 A1    Nov. 23, 2023

(30) Foreign Application Priority Data

May 18, 2022  (JP) .................................. 2022-081297

(51) Int. Cl.
  *H04B 10/294* (2013.01)
  *H04Q 11/00* (2006.01)

(52) U.S. Cl.
  CPC . *H04Q 11/0005* (2013.01); *H04Q 2011/0058* (2013.01)

(58) Field of Classification Search
  CPC ................................................... H04B 10/294
  See application file for complete search history.

(56) References Cited

U.S. PATENT DOCUMENTS

| 2002/0149840 | A1* | 10/2002 | So ....................... H01S 3/13013 |
| | | | 359/337.1 |
| 2020/0403701 | A1* | 12/2020 | Tanehashi ......... H04L 25/03878 |
| 2021/0058684 | A1* | 2/2021 | Inada .................. H04Q 11/0005 |

FOREIGN PATENT DOCUMENTS

WO    2019/176894 A1    9/2019

* cited by examiner

*Primary Examiner* — Shi K Li
(74) *Attorney, Agent, or Firm* — Sughrue Mion, PLLC

(57) ABSTRACT

According to the present invention, a variable tilt equalization device includes a first variable tilt equalizer including a plurality of first tilt equalizers, a second variable tilt equalizer including a plurality of second tilt equalizers, a first matrix switch being a multi-input/multi-output matrix switch connected to an input side of the first variable tilt equalizer, a second matrix switch being a multi-input/multi-output matrix switch configured to connect an output side of the first variable tilt equalizer and an input side of the second variable tilt equalizer to each other via a plurality of optical paths, and a third matrix switch being a multi-input/multi-output matrix switch connected to an output side of the second variable tilt equalizer.

20 Claims, 9 Drawing Sheets

Fig. 6A

| FIRST INPUT SIGNAL LIGHT | | | SECOND INPUT SIGNAL LIGHT | | |
|---|---|---|---|---|---|
| TOTAL GAIN TILT AMOUNT | FIRST TILT EQUALIZER | SECOND TILT EQUALIZER | TOTAL GAIN TILT AMOUNT | FIRST TILT EQUALIZER | SECOND TILT EQUALIZER |
| -4dB | -1dB | -3dB | -4dB | -3dB | -1dB |
| | | | -3dB | -3dB | 0dB |
| | | | -2dB | -3dB | +1dB |
| | | | -1dB | 0dB | -1dB |
| | | | 0dB | 0dB | 0dB |
| | | | +1dB | 0dB | +1dB |
| | | | +2dB | +3dB | -1dB |
| | | | +3dB | +3dB | 0dB |
| | | | +4dB | +3dB | +1dB |
| -3dB | 0dB | -3dB | -4dB | -3dB | -1dB |
| | | | -3dB | -3dB | 0dB |
| | | | -2dB | -3dB | +1dB |
| | | | -1dB | 0dB | -1dB |
| | | | 0dB | 0dB | 0dB |
| | | | +1dB | 0dB | +1dB |
| | | | +2dB | +3dB | -1dB |
| | | | +3dB | +3dB | 0dB |
| | | | +4dB | +3dB | +1dB |
| -2dB | +1dB | -3dB | -4dB | -3dB | -1dB |
| | | | -3dB | -3dB | 0dB |
| | | | -2dB | -3dB | +1dB |
| | | | -1dB | 0dB | -1dB |
| | | | 0dB | 0dB | 0dB |
| | | | +1dB | 0dB | +1dB |
| | | | +2dB | +3dB | -1dB |
| | | | +3dB | +3dB | 0dB |
| | | | +4dB | +3dB | +1dB |

Fig. 6B

| TOTAL GAIN TILT AMOUNT | FIRST INPUT SIGNAL LIGHT | | TOTAL GAIN TILT AMOUNT | SECOND INPUT SIGNAL LIGHT | |
| --- | --- | --- | --- | --- | --- |
| | FIRST TILT EQUALIZER | SECOND TILT EQUALIZER | | FIRST TILT EQUALIZER | SECOND TILT EQUALIZER |
| −1dB | −1dB | 0dB | −4dB | −3dB | −1dB |
| | | | −3dB | 0dB | −3dB |
| | | | −2dB | −3dB | +1dB |
| | | | −1dB | 0dB | −1dB |
| | | | 0dB | +1dB | −1dB |
| | | | +1dB | 0dB | +1dB |
| | | | +2dB | +3dB | −1dB |
| | | | +3dB | 0dB | +3dB |
| | | | +4dB | +3dB | +1dB |
| 0dB | 0dB | 0dB | −4dB | −3dB | −1dB |
| | +1dB | −1dB | −3dB | 0dB | −3dB |
| | 0dB | 0dB | −2dB | −3dB | +1dB |
| | +3dB | −3dB | −1dB | 0dB | −1dB |
| | 0dB | 0dB | 0dB | +1dB | −1dB |
| | +3dB | −3dB | +1dB | 0dB | +1dB |
| | 0dB | 0dB | +2dB | +3dB | −1dB |
| | +1dB | −1dB | +3dB | 0dB | +3dB |
| | 0dB | 0dB | +4dB | +3dB | +1dB |
| +1dB | +1dB | 0dB | −4dB | −3dB | −1dB |
| | | | −3dB | 0dB | −3dB |
| | | | −2dB | −3dB | +1dB |
| | | | −1dB | −1dB | −1dB |
| | | | 0dB | 0dB | +1dB |
| | | | +1dB | 0dB | −1dB |
| | | | +2dB | +3dB | −1dB |
| | | | +3dB | 0dB | +3dB |
| | | | +4dB | +3dB | +1dB |

Fig. 6C

| FIRST INPUT SIGNAL LIGHT | | | SECOND INPUT SIGNAL LIGHT | | |
|---|---|---|---|---|---|
| TOTAL GAIN TILT AMOUNT | FIRST TILT EQUALIZER | SECOND TILT EQUALIZER | TOTAL GAIN TILT AMOUNT | FIRST TILT EQUALIZER | SECOND TILT EQUALIZER |
| +2dB | -1dB | +3dB | -4dB | -3dB | -1dB |
| | | | -3dB | -3dB | 0dB |
| | | | -2dB | -3dB | +1dB |
| | | | -1dB | 0dB | -1dB |
| | | | 0dB | +1dB | -1dB |
| | | | +1dB | 0dB | +1dB |
| | | | +2dB | +3dB | -1dB |
| | | | +3dB | +3dB | 0dB |
| | | | +4dB | +3dB | +1dB |
| +3dB | 0dB | +3dB | -4dB | -3dB | -1dB |
| | | | -3dB | -3dB | 0dB |
| | | | -2dB | -3dB | +1dB |
| | | | -1dB | -1dB | 0dB |
| | | | 0dB | +1dB | +1dB |
| | | | +1dB | +3dB | 0dB |
| | | | +2dB | +3dB | +1dB |
| | | | +3dB | +3dB | 0dB |
| | | | +4dB | +3dB | +1dB |
| +4dB | +1dB | +3dB | -4dB | -3dB | -1dB |
| | | | -3dB | -3dB | 0dB |
| | | | -2dB | -3dB | +1dB |
| | | | -1dB | 0dB | -1dB |
| | | | 0dB | 0dB | 0dB |
| | | | +1dB | 0dB | +1dB |
| | | | +2dB | +3dB | -1dB |
| | | | +3dB | +3dB | 0dB |
| | | | +4dB | +3dB | +1dB |

VARIABLE TILT EQUALIZATION DEVICE AND VARIABLE TILT EQUALIZATION METHOD

This application is based upon and claims the benefit of priority from Japanese Patent Application No. 2022-081297, filed on May 18, 2022, the disclosure of which is incorporated herein in its entirety by reference.

TECHNICAL FIELD

The present disclosure relates to a variable tilt equalization device and a variable tilt equalization method, more particularly to a variable tilt equalization device and a variable tilt equalization method that are used in an optical transmission system utilizing a multi-core fiber.

BACKGROUND ART

In a long-distance optical transmission system such as an optical submarine cable system, it is desired that a tilt of an optical intensity profile be equalized from the beginning of life (BOL) to the end of life (EOL) of an operation, in order to secure transmission equality. However, a loss is increased due to repair work or aging degradation of a submarine cable, and hence the tilt of the optical intensity profile changes.

Thus, a variable tilt equalizer device capable of adjusting the tilt of the optical intensity profile in a freely selected manner is required for the purpose of equalization of the tilt of the optical intensity profile during an operation of the optical transmission system. An example of such a variable tilt equalizer device is described in International Patent Publication WO2019/176894.

Currently, in an optical submarine cable system, an optical signal in a signal band being a conventional-band (C band) is transmitted through use of a single core fiber. In this case, it is required that the number of optical fibers be increased for the purpose of increasing a communication capacity in the optical transmission system. However, the number of optical fibers mounted to the submarine cable is limited, and hence it is difficult to increase the number of optical fibers in the optical submarine cable system. Thus, an attempt at using a multi-core fiber acquired by mounting a plurality of cores in one optical fiber has been made for optical communication, and practical application thereof has also been examined in the optical submarine cable system.

In an optical transmission system using such a multi-core fiber (multi-core optical transmission system), a variable tilt equalizer device 500 in the related art as illustrated in FIG. 7 may be used, for example, for the purpose of maintaining equalization of the tilt of the optical intensity profile. The variable tilt equalizer device 500 in the related art includes fan-in/fan-out devices 511 and 512, a plurality of tilt equalizer devices 521 and 522, and optical switches 531, 532, 533, and 534. The fan-in/fan-out devices 511 and 512 connects each of the cores of the multi-core fiber and the single core fibers to each other. Each of the tilt equalizer devices 521 and 522 adjusts the tilt of the optical intensity profile of the signal light that propagates through the single core fiber. Further, the optical switches 531, 532, 533, and 534 switch connection of the tilt equalizer devices 521 and 522.

In the example illustrated in FIG. 7, the variable tilt equalizer device 500 in the related art includes the nine tilt equalizer devices 521 and the nine tilt equalizer devices 522. Each of the tilt amounts of the tilt equalizer devices 521 and 522 is any one of −4 dB (decibel), −3 dB, −2 dB, −1 dB, 0 dB, +1 dB, +2 dB, +3 dB, and +4 dB. Therefore, the adjustment range of the tilt amount is from −4 dB to +4 dB.

In the variable tilt equalizer device 500 in the related art, it is required that the number of the tilt equalizer devices 521 and 522 be increased for the purpose of expanding the adjustment range of the tilt amount. Meanwhile, in a submarine device used in the optical submarine cable system, the number of optical devices that can be mounted on one device is limited. Thus, when the number of optical devices used for one signal line (core) is increased, the number of signal lines (cores) for which the one variable tilt equalizer device 500 in the related art is capable of adjusting the tilt amounts is reduced. As a result, in a multi-core system using a large number of signal lines (cores), the number of the variable tilt equalizer devices 500 in the related art is increased, which leads to an increase of a system price.

When the tilt of the optical intensity profile is equalized in the multi-core optical transmission system as described above, there arises a problem, that is, an increase of a system price.

SUMMARY

An example object of the disclosure is to provide a variable tilt equalization device and a variable tilt equalization method that solve a problem of an increase of a system price for equalizing a tilt of an optical intensity profile in a multi-core optical transmission system.

A variable tilt equalization device according to an example aspect of the disclosure includes a first variable tilt equalizer including a plurality of first tilt equalizers, a second variable tilt equalizer including a plurality of second tilt equalizers, a first matrix switch being a multi-input/multi-output matrix switch connected to an input side of the first variable tilt equalizer, a second matrix switch being a multi-input/multi-output matrix switch configured to connect an output side of the first variable tilt equalizer and an input side of the second variable tilt equalizer to each other via a plurality of optical paths, and a third matrix switch being a multi-input/multi-output matrix switch connected to an output side of the second variable tilt equalizer.

A variable tilt equalization method according to an example aspect of the disclosure includes receiving first input signal light and second input signal light, selecting a first gain tilt amount, a second gain tilt amount, a third gain tilt amount, and a fourth gain tilt amount from a plurality of gain tilt amounts, adjusting a tilt of an optical intensity profile of the first input signal light with the first gain tilt amount and outputting first signal light, adjusting a tilt of an optical intensity profile of the second input signal light with the second gain tilt amount and outputting second signal light, adjusting a tilt of an optical intensity profile of the first signal light with the third gain tilt amount and outputting first output signal light, and adjusting a tilt of an optical intensity profile of the second signal light with the fourth gain tilt amount and outputting second output signal light.

BRIEF DESCRIPTION OF THE DRAWINGS

Exemplary features and advantages of the present disclosure will become apparent from the following detailed description when taken with the accompanying drawings in which:

FIG. 6A is a diagram illustrating combinations of gain tilt amounts of a first tilt equalizer and a second tilt equalizer that are included in the variable tilt equalization device according to the second example embodiment of the present disclosure;

FIG. 6B is a diagram illustrating combinations of gain tilt amounts of the first tilt equalizer and the second tilt equalizer that are included in the variable tilt equalization device according to the second example embodiment of the present disclosure;

FIG. 6C is a diagram illustrating combinations of gain tilt amounts of the first tilt equalizer and the second tilt equalizer that are included in the variable tilt equalization device according to the second example embodiment of the present disclosure.

EXAMPLE EMBODIMENT

With reference to the drawings, example embodiments of the present disclosure are described below.

First Example Embodiment

Figure 1:
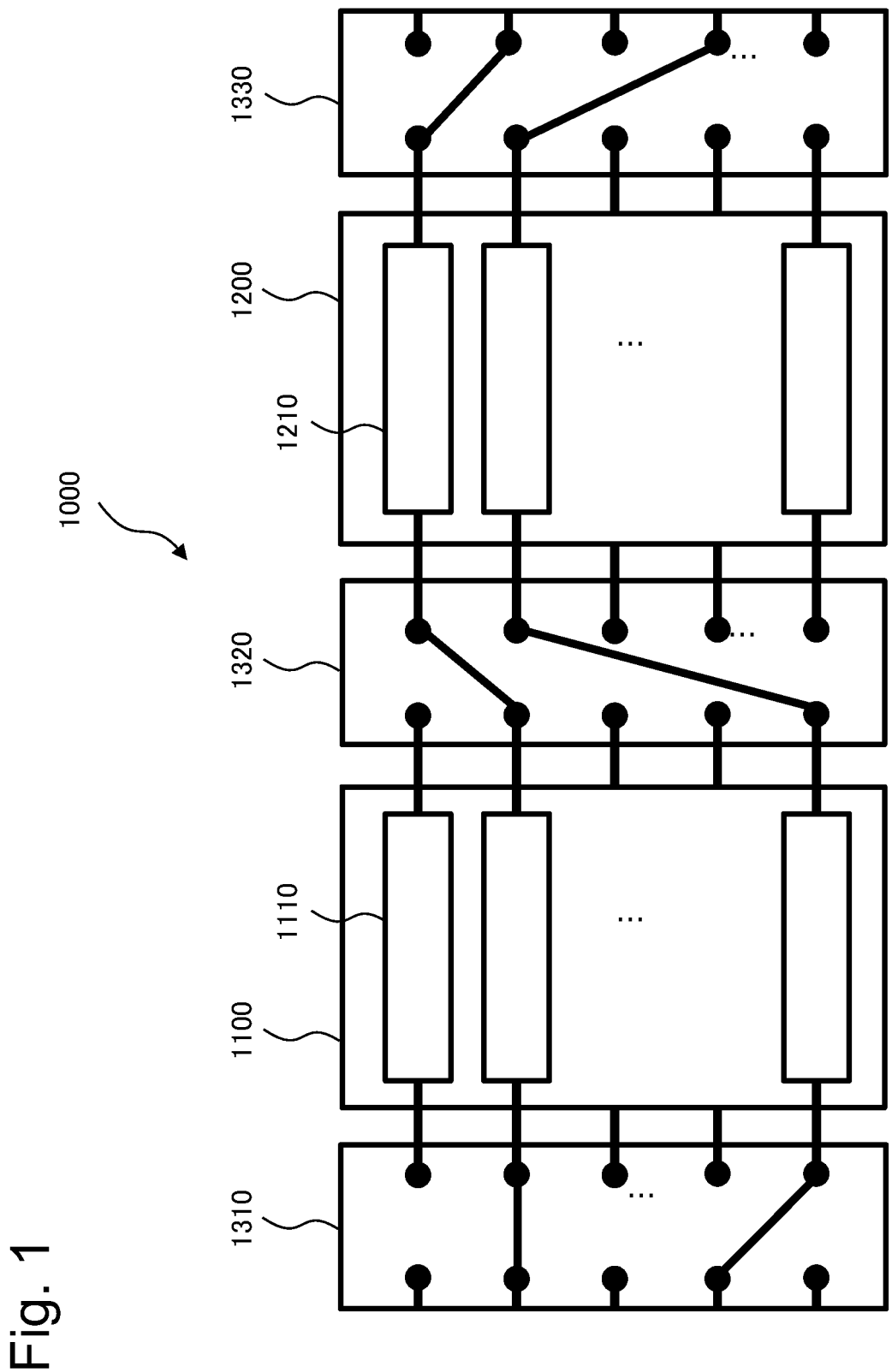
FIG. 1 is a block diagram illustrating a configuration of a variable tilt equalization device according to a first example embodiment of the present disclosure.

FIG. 1 is a block diagram illustrating a configuration of a variable tilt equalization device 1000 according to a first example embodiment of the present disclosure. The variable tilt equalization device 1000 includes a first variable tilt equalizer 1100, the second variable tilt equalizer 1200, a first matrix switch 1310, a second matrix switch 1320, a third matrix switch 1330. The variable tilt equalization device 1000 is suitably used in an optical submarine cable system utilizing a multi-core fiber.

The first variable tilt equalizer 1100 includes a plurality of first tilt equalizers 1110. The second variable tilt equalizer 1200 includes a plurality of second tilt equalizers 1210.

The first matrix switch 1310 is a multi-input/multi-output matrix switch connected to an input side of the first variable tilt equalizer 1100. The second matrix switch 1320 is a multi-input/multi-output matrix switch that connects an output side of the first variable tilt equalizer 1100 and an input side of the second variable tilt equalizer 1200 to each other via a plurality of optical paths. Further, the third matrix switch 1330 is a multi-input/multi-output matrix switch connected to an output side of the second variable tilt equalizer 1200.

In this manner, the variable tilt equalization device 1000 according to the present example embodiment includes the first matrix switch 1310 in the first half and the third matrix switch 1330 in the second half. Further, in the configuration of the variable tilt equalization device 1000, the first variable tilt equalizer 1100 and the second variable tilt equalizer 1200 are connected to each other in series by the second matrix switch 1320 via the plurality of optical paths. Thus, the plurality of first tilt equalizers 1110 and the plurality of second tilt equalizers 1210 are combined with each other in a freely selected manner for each of a plurality of pieces of input signal light, and thus the tilt of the optical intensity profile of each piece of input signal light can be compensated. As a result, the number of the first tilt equalizers 1110 and the number of the second tilt equalizers 1210 can be reduced as compared to a case in which an optical switch is used (see FIG. 7). Therefore, even when the number of optical devices that can be mounted on one device is limited, the one variable tilt equalization device 1000 enables equalization of the tilts of the optical intensity profiles of the plurality of pieces of input signal light. In other words, the variable tilt equalization device 1000 according to the present example embodiment enables equalization of the tilt of the optical intensity profile in the multi-core optical transmission system without increasing a system price.

Figure 2:
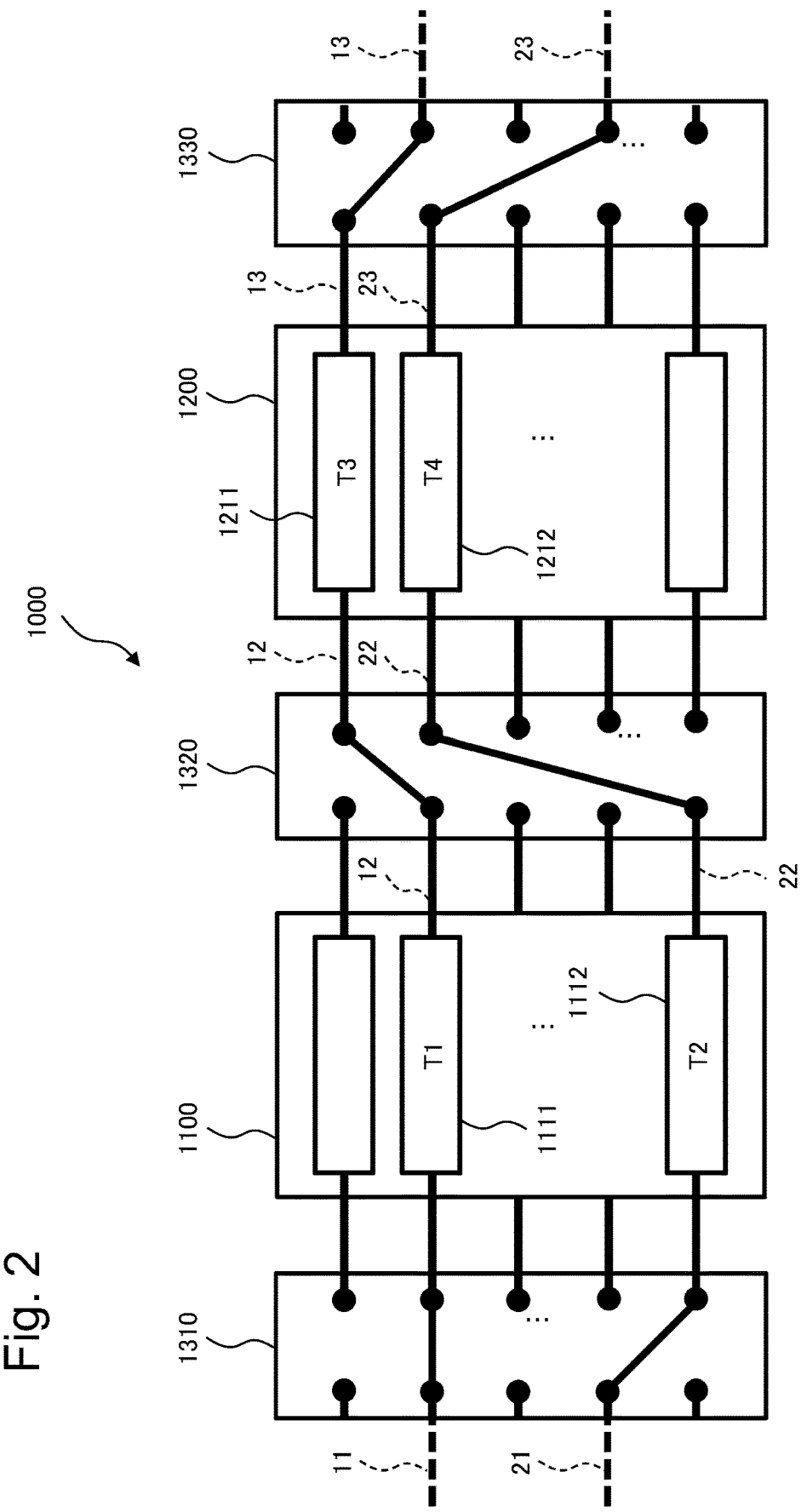
FIG. 2 is a block diagram for describing the configuration of the variable tilt equalization device according to the first example embodiment of the present disclosure.

With reference to FIG. 2, the configuration of the variable tilt equalization device 1000 is further described in detail.

The first matrix switch 1310 is configured to receive first input signal light 11 and second input signal light 21, and to connect the first input signal light 11 and the second input signal light 21 to the input side of the first variable tilt equalizer 1100 via different optical paths.

A first tilt equalizer 1111 being one of the plurality of first tilt equalizers 1110 is configured to adjust the tilt of the optical intensity profile of the first input signal light 11 with a first gain tilt amount T1, and to output first signal light 12. A first tilt equalizer 1112 being another one of the plurality of first tilt equalizers 1110 is configured to adjust the tilt of the optical intensity profile of the second input signal light 21 with a second gain tilt amount T2, and to output second signal light 22.

Further, a second tilt equalizer 1211 being one of the plurality of second tilt equalizers 1210 is configured to adjust the tilt of the optical intensity profile of the first signal light 12 with a third gain tilt amount T3, and to output first output signal light 13. Further, a second tilt equalizer 1212 being another one of the plurality of second tilt equalizers 1210 is configured to adjust the tilt of the optical intensity profile of the second signal light 22 with a fourth gain tilt amount T4, and to output second output signal light 23.

Here, the second matrix switch 1320 is configured to connect the first tilt equalizer 1111 and the second tilt equalizer 1211 to each other that compensate the tilt of the optical intensity profile of the first input signal light 11 with the sum of the first gain tilt amount T1 and the third gain tilt amount T3. Further, the second matrix switch 1320 is configured to connect the first tilt equalizer 1112 and the second tilt equalizer 1212 to each other that compensate the tilt of the optical intensity profile of the second input signal light 21 with the sum of the second gain tilt amount T2 and the fourth gain tilt amount T4.

It can be assumed that the first variable tilt equalizer 1100 include the plurality of first tilt equalizers 1110 with the first gain tilt amount T1 and the second gain tilt amount T2 that are different from each other. Further, it can be assumed that the second variable tilt equalizer 1200 include the plurality of second tilt equalizers 1210 with the third gain tilt amount T3 and the fourth gain tilt amount T4 that are different from each other.

The third matrix switch 1330 is configured to receive the first output signal light 13 and the second output signal light 23, and to send out the first output signal light 13 and the second output signal light 23 from different connection terminals (connectors).

It can be assumed that the first matrix switch 1310 is configured to receive the first input signal light 11 and the second input signal light 21 that propagate through different cores of the input-side multi-core fiber. Further, it can be assumed that the third matrix switch 1330 is configured to send out the first output signal light 13 and the second output signal light 23 to different cores of the output-side multi-core fiber.

Figure 3:
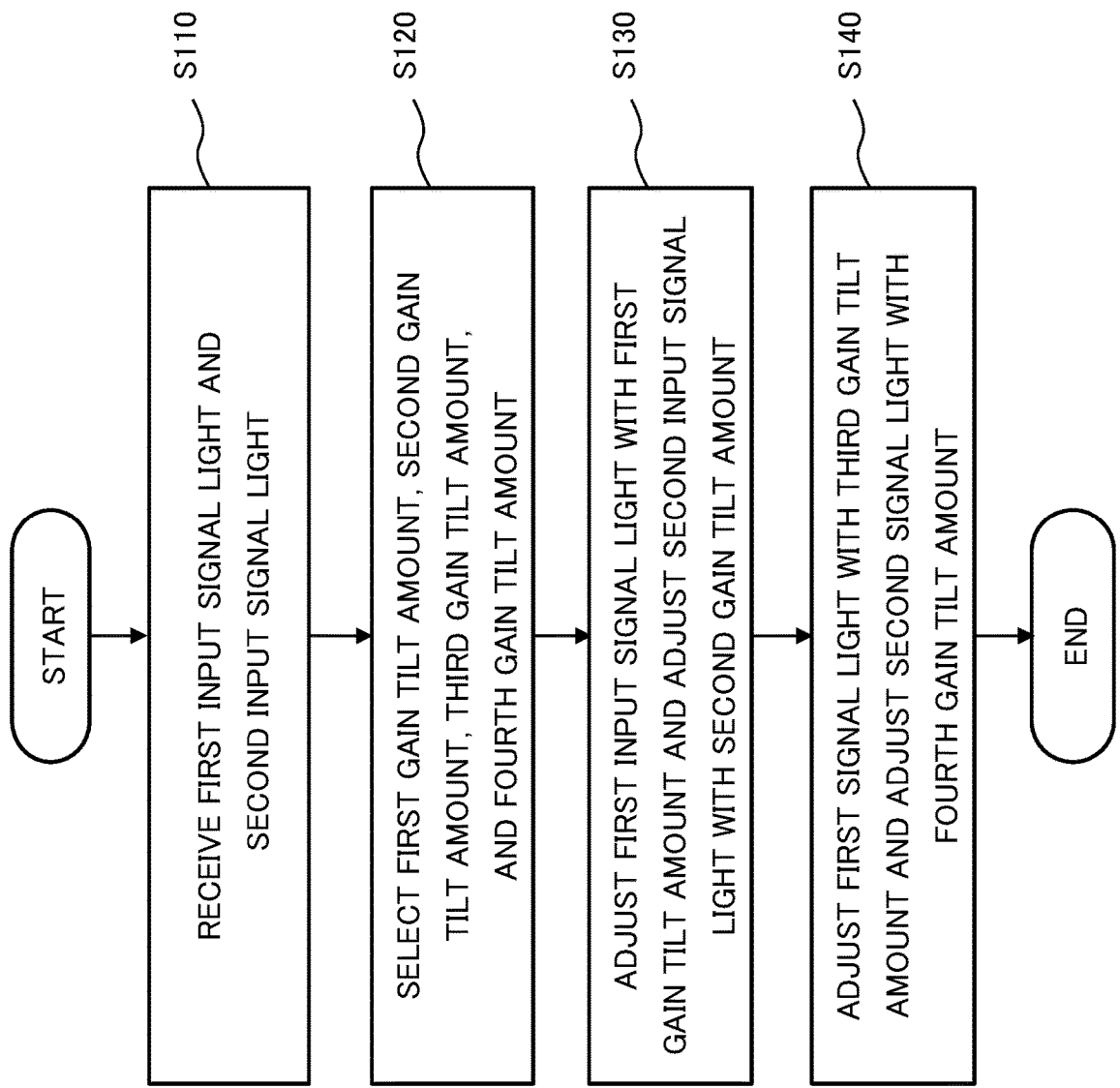
FIG. 3 is a flowchart for describing a variable tilt equalization method according to the first example embodiment of the present disclosure.

Next, with reference to the flowchart illustrated in FIG. 3, a variable tilt equalization method according to the present example embodiment is described.

In the variable tilt equalization method according to the present example embodiment, first, the first input signal light and the second input signal light are received (Step S110). Further, the first gain tilt amount, the second gain tilt amount, the third gain tilt amount, and the fourth gain tilt amount are selected from the plurality of gain tilt amounts (Step S120). Subsequently, the tilt of the optical intensity profile of the first input signal light is adjusted with the first gain tilt amount, the first signal light is output, the tilt of the optical intensity profile of the second input signal light is adjusted with the second gain tilt amount, and the second signal light is output (Step S130). Further, the tilt of the optical intensity profile of the first signal light is adjusted with the third gain tilt amount, the first output signal light is output, the tilt of the optical intensity profile of the second signal light is adjusted with the fourth gain tilt amount, and the second output signal light is output (Step S140).

With this configuration, according to the variable tilt equalization method according to the present example embodiment, the plurality of gain tilt amounts are combined with each other in a freely selected manner for each of the plurality of pieces of input signal light, and thus the tilt of the optical intensity profile of each piece of input signal light can be compensated. As a result, the types of the plurality of gain tilt amounts that are prepared in advance can be reduced. Therefore, the tilts of the optical intensity profiles of the plurality of pieces of input signal light can be equalized without increasing a scale of the system in which the variable tilt equalization method is implemented.

Here, it can be assumed that selecting the first gain tilt amount, the second gain tilt amount, the third gain tilt amount, and the fourth gain tilt amount includes the following selection methods. Specifically, it can be assumed that the first gain tilt amount and the third gain tilt amount are selected in such a way that the sum of the first gain tilt amount and the third gain tilt amount compensates the tilt of the optical intensity profile of the first input signal light. Further, it can be assumed that the second gain tilt amount and the fourth gain tilt amount are selected in such a way that the sum of the second gain tilt amount and the fourth gain tilt amount compensate the tilt of the optical intensity profile of the second input signal light.

It can be assumed that the first gain tilt amount may be an amount different from the second gain tilt amount. Further, it can be assumed that the third gain tilt amount may be an amount different from the fourth gain tilt amount.

It can be assumed that receiving the first input signal light and the second input signal light described above includes receiving the first input signal light and the second input signal light that propagate through different cores of the input-side multi-core fiber.

As described above, the variable tilt equalization device 1000 and the variable tilt equalization method according to the present example embodiment enable equalization of the tilt of the optical intensity profile in the multi-core optical transmission system without increasing a system price.

Second Example Embodiment

Figure 4:
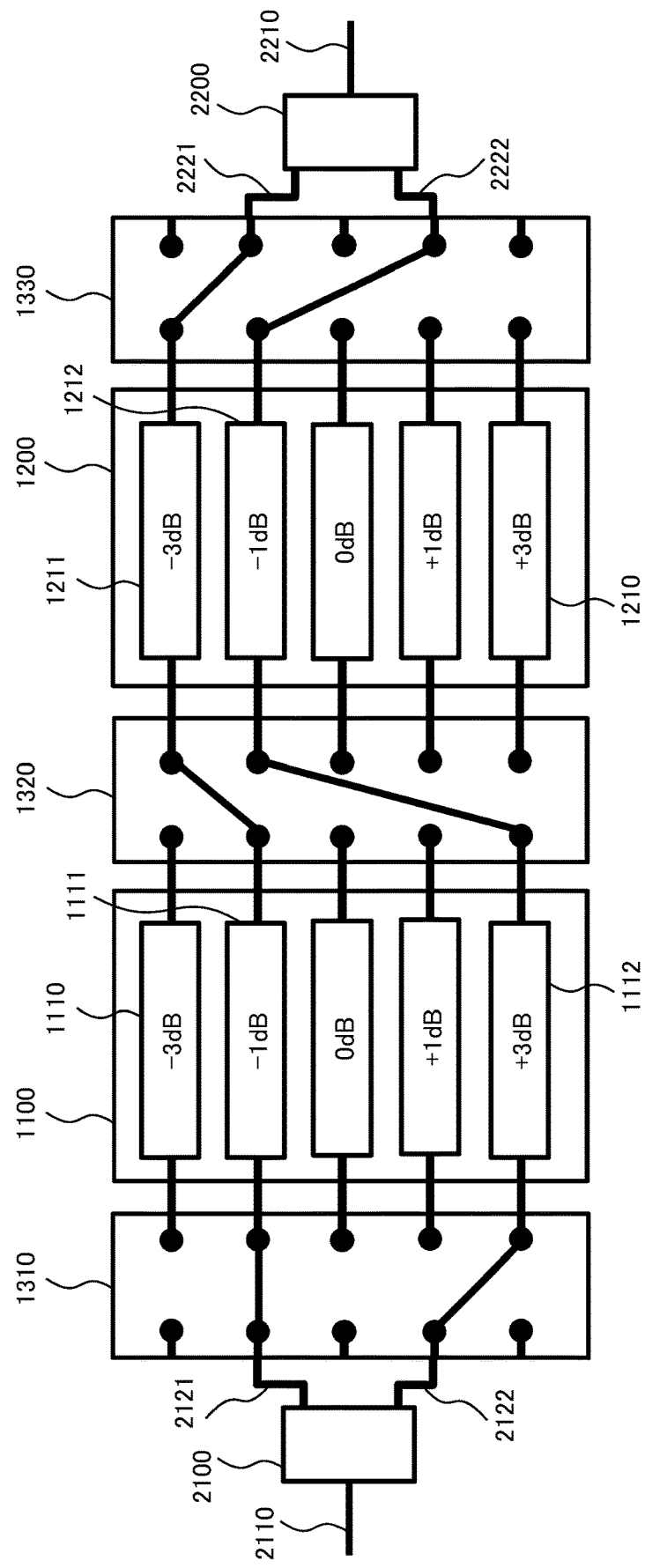
FIG. 4 is a block diagram illustrating a configuration of a variable tilt equalization device according to a second example embodiment of the present disclosure.

Next, a second example embodiment of the present disclosure is described. FIG. 4 illustrates a configuration of a variable tilt equalization device 2000 according to the present example embodiment. The variable tilt equalization device 2000 includes the first variable tilt equalizer 1100, the second variable tilt equalizer 1200, the first matrix switch 1310, the second matrix switch 1320, and the third matrix switch 1330. the variable tilt equalization device 2000 is suitably used in an optical submarine cable system utilizing a multi-core fiber.

The first variable tilt equalizer 1100 includes the plurality of first tilt equalizers 1110. the second variable tilt equalizer 1200 includes the plurality of second tilt equalizers 1210. FIG. 4 illustrates an example in which the first variable tilt equalizer 1100 and the second variable tilt equalizer 1200 include the five first tilt equalizers 1110 and the five second tilt equalizers 1210 having gain tilt amounts of −3 dB (decibel), −1 dB, 0 dB, +1 dB, and +3 dB, respectively. In this case, any one of the first tilt equalizers 1110 and any one of the second tilt equalizers 1210 are selected and connected to each other, and thus the gain tilt amount can be changed within a range from −4 dB to +4 dB.

The first matrix switch 1310 is a multi-input/multi-output matrix switch connected to the input side of the first variable tilt equalizer 1100. the second matrix switch 1320 is a multi-input/multi-output matrix switch that connects the output side of the first variable tilt equalizer 1100 and the input side of the second variable tilt equalizer 1200 to each other via the plurality of optical paths. Further, the third matrix switch 1330 is a multi-input/multi-output matrix switch connected to the output side of the second variable tilt equalizer 1200.

The configuration and the operation of each of the units described above are similar to the configuration and the operation of the variable tilt equalization device 1000 according to the first example embodiment. In this configuration, the variable tilt equalization device 2000 according to the present example embodiment further includes a first fan-in/fan-out 2100 and a second fan-in/fan-out 2200.

The first fan-in/fan-out 2100 is configured to connect different cores of an input-side multi-core fiber 2110, and a first single core fiber 2121 and a second single core fiber 2122 to each other. The second fan-in/fan-out 2200 is configured to connect different cores of an output-side multi-core fiber 2210, and a third single core fiber 2221 and a fourth single core fiber 2222 to each other.

In this case, the first matrix switch 1310 is configured to connect, to the first tilt equalizer 1111 being one of the plurality of first tilt equalizers 1110, the first input signal light that propagates through the first single core fiber 2121. Further, the first matrix switch 1310 is configured to connect, to the first tilt equalizer 1112 being another one of the plurality of first tilt equalizers 1110, the second input signal light that propagates through the second single core fiber 2122.

Further, the third matrix switch 1330 is configured to connect the first output signal light to the third single core fiber 2221, and to connect the second output signal light to the fourth single core fiber 2222.

As described above, the variable tilt equalization device 2000 according to the present example embodiment includes the first matrix switch 1310 in the first half and the third matrix switch 1330 in the second half. Further, in the configuration of the variable tilt equalization device 2000, the first variable tilt equalizer 1100 and the second variable tilt equalizer 1200 are connected to each other in series by the second matrix switch 1320 via the plurality of optical paths. Thus, the number of the first tilt equalizers 1110 and the number of the second tilt equalizers 1210 can be reduced as compared to a case in which an optical switch is used (see FIG. 7). As a result, the variable tilt equalization device 2000 according to the present example embodiment enables equalization of the tilt of the optical intensity profile in the multi-core optical transmission system without increasing a system price.

Figure 5:
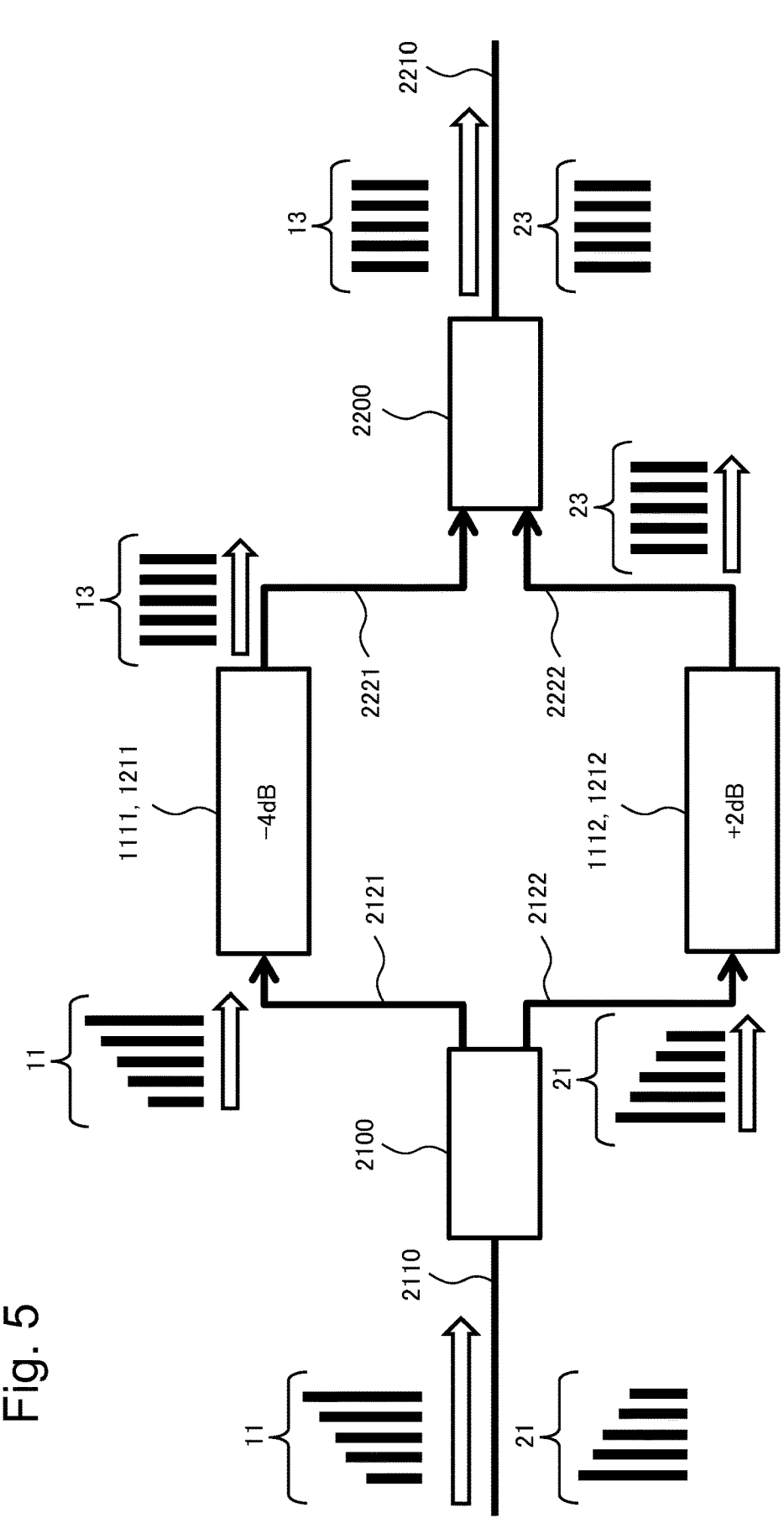
FIG. 5 is a diagram for describing an operation of the variable tilt equalization device according to the second example embodiment of the present disclosure.

Next, with reference to FIG. 5, description is made on gain equalization in the multi-core optical transmission system utilizing the variable tilt equalization device 2000 according to the present example embodiment.

The first input signal light 11 and the second input signal light 21 that propagate through different cores of the input-side multi-core fiber 2110 are introduced to the first single core fiber 2121 and the second single core fiber 2122, respectively, by the first fan-in/fan-out 2100.

The gain tilt of the first input signal light 11 is equalized by "−4 dB" in total by the first tilt equalizer 1111 having the gain tilt amount of "−1 dB" and the second tilt equalizer 1211 having the gain tilt amount of "−3 dB" (see FIG. 4). Similarly, the gain tilt of the second input signal light 21 is equalized by "+2 dB" in total by the first tilt equalizer 1112 having the gain tilt amount of "+3 dB" and the second tilt equalizer 1212 having the gain tilt amount of "−1 dB" (see FIG. 4).

The first output signal light 13 and the second output signal light 23 that have the equalized gain tilts are guided through the third single core fiber 2221 and the fourth single core fiber 2222, and are connected to different cores of the output-side multi-core fiber 2210 by the second fan-in/fan-out 2200.

As described with reference to FIG. 4, the first input signal light and the second input signal light that propagate the first single core fiber 2121 and the second single core fiber 2122, respectively, are guided to the first variable tilt equalizer 1100 via the first matrix switch 1310. In the first variable tilt equalizer 1100, the first tilt equalizer 1110 adjusts the tilt of the optical intensity profile of each of the first input signal light and the second input signal light with any one of the gain tilt amounts of −3 dB, −1 dB, 0 dB, +1 dB, and +3 dB. Subsequently, in the second variable tilt equalizer 1200 adjusts the second tilt equalizer 1210 adjusts the tilt of the optical intensity profile with any one of the gain tilt amounts of −3 dB, −1 dB, 0 dB, +1 dB, and +3 dB. With this, the gain of each of the first input signal light and the second input signal light is equalized in such a way that the tilt of the optical intensity profile is equalized.

The first output signal light and the second output signal light that have the equalized gains are outputs to the third single core fiber 2221 and the fourth single core fiber 2222, respectively, via the third matrix switch 1330. The first output signal light and the second output signal light are guided to different cores of the output-side multi-core fiber 2210 via the second fan-in/fan-out 2200.

Figure 7:
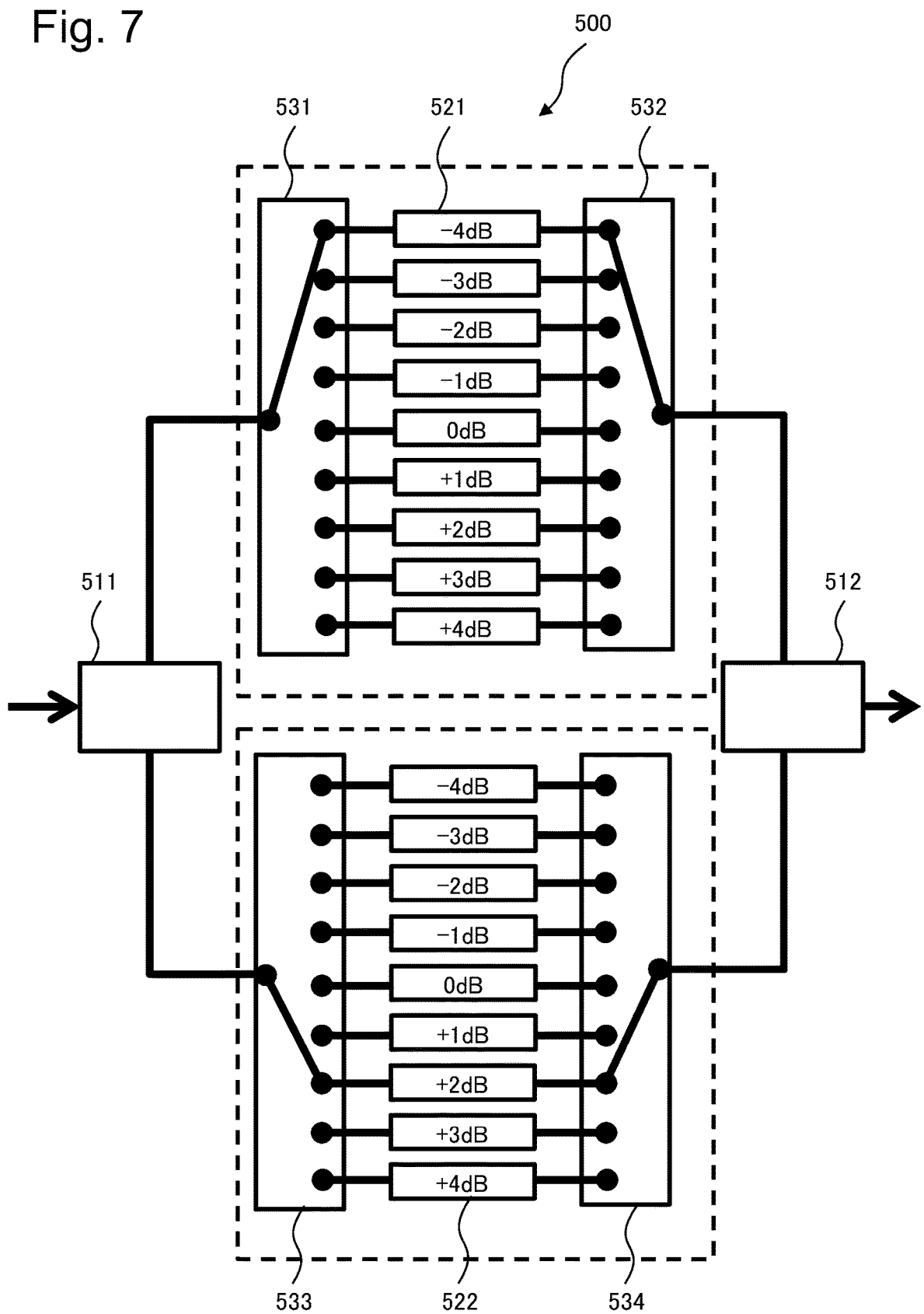
FIG. 7 is a block diagram illustrating a configuration of variable tilt equalizer device in the related art.

FIG. 6A, FIG. 6B, and FIG. 6C show combinations of the gain tilt amounts of the first tilt equalizer and the second tilt equalizer. The gain tilt amounts of the first tilt equalizer and the second tilt equalizer are combined with each other, and thus the tilts of the optical intensity profiles of the first input signal light and the second input signal light can be adjusted with a freely selected gain tilt amount within a range from −4 dB to +4 dB. The adjustment range of the gain tilt amount herein is equivalent to an adjustment range of a variable tilt equalizer device in the related art, which is illustrated in FIG. 7.

The number of optical devices included in the variable tilt equalization device 2000 according to the present example embodiment is fifteen in total including the ten tilt equalizers, the three matrix switches, and the two fan-in/fan-outs. In contrast, the number of optical devices included in the variable tilt equalizer device in the related art, which is illustrated in FIG. 7, is twenty-four in total including eighteen tilt equalizer devices, four optical switches, and two fan-in/fan-out devices. Therefore, the variable tilt equalization device 2000 according to the present example embodiment enables reduction of the number of optical devices to be used by nine.

Next, a variable tilt equalization method according to the present example embodiment is described.

In the variable tilt equalization method according to the present example embodiment, first, the first input signal light and the second input signal light are received (Step S110 in FIG. 3). Further, the first gain tilt amount, the second gain tilt amount, the third gain tilt amount, and the fourth gain tilt amount are selected from the plurality of gain tilt amounts (Step S120 in FIG. 3). Subsequently, the tilt of the optical intensity profile of the first input signal light is adjusted with the first gain tilt amount, the first signal light is output, the tilt of the optical intensity profile of the second input signal light is adjusted with the second gain tilt amount, and the second signal light is output (Step S130 in FIG. 3). Further, the tilt of the optical intensity profile of the first signal light is adjusted with the third gain tilt amount, the first output signal light is output, the tilt of the optical intensity profile of the second signal light is adjusted with the fourth gain tilt amount, and the second output signal light is output (Step S140 in FIG. 3).

The steps described above are similar to those in the variable tilt equalization method according to the first example embodiment. In the variable tilt equalization method according to the present example embodiment, it is assumed that the first input signal light and the second input signal light are received, the first input signal light and the second input signal light propagating through the first single core fiber and the second single core fiber, respectively, that are connected to different cores of the input-side multi-core fiber.

Further, it may be assumed that the first output signal light and the second output signal light are sent out to different cores of the output-side multi-core fiber. In this case, it may be assumed that the first output signal light and the second output signal light are sent out to the third single core fiber and the four single core fiber, respectively, that are connected to different cores of the output-side multi-core fiber.

As described above, the variable tilt equalization device 2000 and the variable tilt equalization method according to the present example embodiment enable equalization of the tilt of the optical intensity profile in the multi-core optical transmission system without increasing a system price.

An example advantage according to the disclosure is that the variable tilt equalization device and the variable tilt equalization method according to the present disclosure enable equalization of the tilt of the optical intensity profile in the multi-core optical transmission system without increasing a system price.

The whole or part of the example embodiments disclosed above can be described as, but not limited to, the following supplementary notes.

(Supplementary note 1) A variable tilt equalization device comprising: a first variable tilt equalizer including a plurality of first tilt equalizers; a second variable tilt equalizer including a plurality of second tilt equalizers; a first matrix switch being a multi-input/multi-output matrix switch connected to an input side of the first variable tilt equalizer; a second matrix switch being a multi-input/multi-output matrix switch configured to connect an output side of the first variable tilt equalizer and an input side of the second variable tilt equalizer to each other via a plurality of optical paths; and a third matrix switch being a multi-input/multi-output matrix switch connected to an output side of the second variable tilt equalizer.

(Supplementary note 2) The variable tilt equalization device according to supplementary note 1, wherein the first matrix switch is configured to receive first input signal light and second input signal light, and to connect the first input signal light and the second input signal light to the input side of the first variable tilt equalizer via different optical paths.

(Supplementary note 3) The variable tilt equalization device according to supplementary note 2, wherein one first tilt equalizer of the plurality of first tilt equalizers is configured to adjust a tilt of an optical intensity profile of the first input signal light with a first gain tilt amount, and to output first signal light, another first tilt equalizer of the plurality of first tilt equalizers is configured to adjust a tilt of an optical intensity profile of the second input signal light with a second gain tilt amount, and to output second signal light, one second tilt equalizer of the plurality of second tilt equalizers is configured to adjust a tilt of an optical intensity profile of the first signal light with a third gain tilt amount, and to output first output signal light, and another second tilt equalizer of the plurality of second tilt equalizers is configured to adjust a tilt of an optical intensity profile of the second signal light with a fourth gain tilt amount, and to output second output signal light.

(Supplementary note 4) The variable tilt equalization device according to supplementary note 3, wherein
the second matrix switch is configured to: connect the one first tilt equalizer and the one second tilt equalizer to each other that compensate a tilt of an optical intensity profile of the first input signal light with a sum of the first gain tilt amount and the third gain tilt amount; and connect the another first tilt equalizer and the another second tilt equalizer to each other that compensate a tilt of an optical intensity profile of the second input signal light with a sum of the second gain tilt amount and the fourth gain tilt amount.

(Supplementary note 5) The variable tilt equalization device according to supplementary note 3 or 4, wherein the first variable tilt equalizer includes the plurality of first tilt equalizers with the first gain tilt amount and the second gain tilt amount that are different from each other, and the second variable tilt equalizer includes the plurality of second tilt equalizers with the third gain tilt amount and the fourth gain tilt amount that are different from each other.

(Supplementary note 6) The variable tilt equalization device according to supplementary note 3 or 4, wherein the third matrix switch is configured to receive the first output signal light and the second output signal light, and to send out the first output signal light and the second output signal light from different connectors.

(Supplementary note 7) The variable tilt equalization device according to supplementary note 3 or 4, wherein the first matrix switch is configured to receive the first input signal light and the second input signal light that propagate through different cores of an input-side multi-core fiber, and the third matrix switch is configured to send out the first output signal light and the second output signal light to different cores of an output-side multi-core fiber.

(Supplementary note 8) The variable tilt equalization device according to supplementary note 7, further comprising: a first fan-in/fan-out configured to connect different cores of the input-side multi-core fiber, and a first single core fiber and a second single core fiber to each other, and a second fan-in/fan-out configured to connect different cores of the output-side multi-core fiber, and a third single core fiber and a fourth single core fiber to each other.

(Supplementary note 9) The variable tilt equalization device according to supplementary note 8, wherein the first matrix switch is configured to connect, to the one first tilt equalizer, the first input signal light that propagates through the first single core fiber, and to connect, to the another first tilt equalizer, the second input signal light that propagates through the second single core fiber, and the third matrix switch is configured to connect the first output signal light to the third single core fiber, and to connect the second output signal light to the fourth single core fiber.

(Supplementary note 10) A variable tilt equalization method comprising: receiving first input signal light and second input signal light; selecting a first gain tilt amount, a second gain tilt amount, a third gain tilt amount, and a fourth gain tilt amount from a plurality of gain tilt amounts; adjusting a tilt of an optical intensity profile of the first input signal light with the first gain tilt amount and outputting first signal light; adjusting a tilt of an optical intensity profile of the second input signal light with the second gain tilt amount and outputting second signal light; adjusting a tilt of an optical intensity profile of the first signal light with the third gain tilt amount and outputting first output signal light; and adjusting a tilt of an optical intensity profile of the second signal light with the fourth gain tilt amount and outputting second output signal light.

(Supplementary note 11) The variable tilt equalization method according to supplementary note 10, wherein the selecting the first gain tilt amount, the second gain tilt amount, the third gain tilt amount, and the fourth gain tilt amount includes selecting the first gain tilt amount and the third gain tilt amount in such a way that a sum of the first gain tilt amount and the third gain tilt amount compensates a tilt of an optical intensity profile of the first input signal light, and selecting the second gain tilt amount and the fourth gain tilt amount in such a way that a sum of the second gain tilt amount and the fourth gain tilt amount compensates a tilt of an optical intensity profile of the second input signal light.

(Supplementary note 12) The variable tilt equalization method according to supplementary note 10 or 11, wherein the first gain tilt amount is different from the second gain tilt amount, and the third gain tilt amount is different from the fourth gain tilt amount.

(Supplementary note 13) The variable tilt equalization method according to supplementary note 10 or 11, wherein the receiving the first input signal light and the second input signal light includes receiving the first input signal light and the second input signal light that propagate through different cores of an input-side multi-core fiber.

(Supplementary note 14) The variable tilt equalization method according to supplementary note 13, wherein the receiving the first input signal light and the second input signal light includes receiving the first input signal light and the second input signal light that propagate through a first single core fiber and a second single core fiber, respectively, that are connected to different cores of the input-side multi-core fiber.

(Supplementary note 15) The variable tilt equalization method according to supplementary note 10 or 11, further comprising: sending out the first output signal light and the second output signal light to different cores of an output-side multi-core fiber.

(Supplementary note 16) The variable tilt equalization method according to supplementary note 15, wherein the sending out the first output signal light and the second output signal light includes sending out the first output signal light and the second output signal light to a third single core fiber and a fourth single core fiber, respectively, that are connected to different cores of the output-side multi-core fiber.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A variable tilt equalization device comprising:
   a first variable tilt equalizer including a plurality of first tilt equalizers;
   a second variable tilt equalizer including a plurality of second tilt equalizers;
   a first matrix switch being a multi-input/multi-output matrix switch connected to an input side of the first variable tilt equalizer;
   a second matrix switch being a multi-input/multi-output matrix switch configured to connect an output side of the first variable tilt equalizer and an input side of the second variable tilt equalizer to each other via a plurality of optical paths; and
   a third matrix switch being a multi-input/multi-output matrix switch connected to an output side of the second variable tilt equalizer.

2. The variable tilt equalization device according to claim 1, wherein
   the first matrix switch is configured to receive first input signal light and second input signal light, and to connect the first input signal light and the second input signal light to the input side of the first variable tilt equalizer via different optical paths.

3. The variable tilt equalization device according to claim 2, wherein
   one first tilt equalizer of the plurality of first tilt equalizers is configured to adjust a tilt of an optical intensity profile of the first input signal light with a first gain tilt amount, and to output first signal light,
   another first tilt equalizer of the plurality of first tilt equalizers is configured to adjust a tilt of an optical intensity profile of the second input signal light with a second gain tilt amount, and to output second signal light,
   one second tilt equalizer of the plurality of second tilt equalizers is configured to adjust a tilt of an optical intensity profile of the first signal light with a third gain tilt amount, and to output first output signal light, and
   another second tilt equalizer of the plurality of second tilt equalizers is configured to adjust a tilt of an optical intensity profile of the second signal light with a fourth gain tilt amount, and to output second output signal light.

4. The variable tilt equalization device according to claim 3, wherein
   the second matrix switch is configured to:
   connect the one first tilt equalizer and the one second tilt equalizer to each other that compensate a tilt of an optical intensity profile of the first input signal light with a sum of the first gain tilt amount and the third gain tilt amount; and
   connect the another first tilt equalizer and the another second tilt equalizer to each other that compensate a tilt of an optical intensity profile of the second input signal light with a sum of the second gain tilt amount and the fourth gain tilt amount.

5. The variable tilt equalization device according to claim 4, wherein
   the first variable tilt equalizer includes the plurality of first tilt equalizers with the first gain tilt amount and the second gain tilt amount that are different from each other, and
   the second variable tilt equalizer includes the plurality of second tilt equalizers with the third gain tilt amount and the fourth gain tilt amount that are different from each other.

6. The variable tilt equalization device according to claim 4, wherein
   the third matrix switch is configured to receive the first output signal light and the second output signal light, and to send out the first output signal light and the second output signal light from different connectors.

7. The variable tilt equalization device according to claim 4, wherein
   the first matrix switch is configured to receive the first input signal light and the second input signal light that propagate through different cores of an input-side multi-core fiber, and
   the third matrix switch is configured to send out the first output signal light and the second output signal light to different cores of an output-side multi-core fiber.

8. The variable tilt equalization device according to claim 7, further comprising:
   a first fan-in/fan-out configured to connect different cores of the input-side multi-core fiber, and a first single core fiber and a second single core fiber to each other, and
   a second fan-in/fan-out configured to connect different cores of the output-side multi-core fiber, and a third single core fiber and a fourth single core fiber to each other.

9. The variable tilt equalization device according to claim 3, wherein
   the first variable tilt equalizer includes the plurality of first tilt equalizers with the first gain tilt amount and the second gain tilt amount that are different from each other, and
   the second variable tilt equalizer includes the plurality of second tilt equalizers with the third gain tilt amount and the fourth gain tilt amount that are different from each other.

10. The variable tilt equalization device according to claim 3, wherein
    the third matrix switch is configured to receive the first output signal light and the second output signal light, and to send out the first output signal light and the second output signal light from different connectors.

11. The variable tilt equalization device according to claim 3, wherein the first matrix switch is configured to receive the first input signal light and the second input signal light that propagate through different cores of an input-side multi-core fiber, and the third matrix switch is configured to send out the first output signal light and the second output signal light to different cores of an output-side multi-core fiber.

12. The variable tilt equalization device according to claim 11, further comprising:
a first fan-in/fan-out configured to connect different cores of the input-side multi-core fiber, and a first single core fiber and a second single core fiber to each other, and
a second fan-in/fan-out configured to connect different cores of the output-side multi-core fiber, and a third single core fiber and a fourth single core fiber to each other.

13. The variable tilt equalization device according to claim 12, wherein
the first matrix switch is configured to connect, to the one first tilt equalizer, the first input signal light that propagates through the first single core fiber, and to connect, to the another first tilt equalizer, the second input signal light that propagates through the second single core fiber, and
the third matrix switch is configured to connect the first output signal light to the third single core fiber, and to connect the second output signal light to the fourth single core fiber.

14. A variable tilt equalization method comprising:
receiving first input signal light and second input signal light;
selecting a first gain tilt amount, a second gain tilt amount, a third gain tilt amount, and a fourth gain tilt amount from a plurality of gain tilt amounts;
adjusting a tilt of an optical intensity profile of the first input signal light with the first gain tilt amount and outputting first signal light;
adjusting a tilt of an optical intensity profile of the second input signal light with the second gain tilt amount and outputting second signal light;
adjusting a tilt of an optical intensity profile of the first signal light with the third gain tilt amount and outputting first output signal light; and
adjusting a tilt of an optical intensity profile of the second signal light with the fourth gain tilt amount and outputting second output signal light.

15. The variable tilt equalization method according to claim 14, wherein
the selecting the first gain tilt amount, the second gain tilt amount, the third gain tilt amount, and the fourth gain tilt amount includes selecting the first gain tilt amount and the third gain tilt amount in such a way that a sum of the first gain tilt amount and the third gain tilt amount compensates a tilt of an optical intensity profile of the first input signal light, and selecting the second gain tilt amount and the fourth gain tilt amount in such a way that a sum of the second gain tilt amount and the fourth gain tilt amount compensates a tilt of an optical intensity profile of the second input signal light.

16. The variable tilt equalization method according to claim 14, wherein
the first gain tilt amount is different from the second gain tilt amount, and the third gain tilt amount is different from the fourth gain tilt amount.

17. The variable tilt equalization method according to claim 14, wherein
the receiving the first input signal light and the second input signal light includes receiving the first input signal light and the second input signal light that propagate through different cores of an input-side multi-core fiber.

18. The variable tilt equalization method according to claim 17, wherein
the receiving the first input signal light and the second input signal light includes receiving the first input signal light and the second input signal light that propagate through a first single core fiber and a second single core fiber, respectively, that are connected to different cores of the input-side multi-core fiber.

19. The variable tilt equalization method according to claim 14, further comprising:
sending out the first output signal light and the second output signal light to different cores of an output-side multi-core fiber.

20. The variable tilt equalization method according to claim 19, wherein
the sending out the first output signal light and the second output signal light includes sending out the first output signal light and the second output signal light to a third single core fiber and a fourth single core fiber, respectively, that are connected to different cores of the output-side multi-core fiber.

* * * * *